United States Patent [19]

Förster

[11] 4,184,386
[45] Jan. 22, 1980

[54] MULTI-SPEED TRANSMISSION, ESPECIALLY FOR MOTOR VEHICLES

[75] Inventor: Hans-Joachim M. Förster, Stuttgart, Fed. Rep. of Germany

[73] Assignee: Daimler-Benz Aktiengesellschaft, Fed. Rep. of Germany

[21] Appl. No.: 168,908

[22] Filed: Aug. 4, 1971

[30] Foreign Application Priority Data

Aug. 4, 1970 [DE] Fed. Rep. of Germany ....... 2038600

[51] Int. Cl.² ............................................ F16H 57/10
[52] U.S. Cl. ...................................... 74/688; 74/677; 74/763; 74/753
[58] Field of Search ................. 74/677, 688, 718, 762, 74/763, 730, 753

[56] References Cited

U.S. PATENT DOCUMENTS

| 2,368,873 | 2/1945 | Pollard | 74/677 |
| 2,437,333 | 3/1948 | Pollard | 74/677 X |
| 2,519,022 | 8/1950 | Burtnett | 74/688 |
| 2,623,407 | 12/1952 | Mayner | 74/677 |
| 3,209,618 | 10/1965 | Schwab | 74/763 X |
| 3,238,813 | 3/1966 | Moan | 74/677 |
| 3,270,587 | 9/1966 | Geray | 74/718 X |
| 3,339,431 | 9/1967 | Crosswhite et al. | 74/763 X |
| 3,355,967 | 12/1967 | Moan | 74/763 X |
| 3,483,771 | 12/1969 | Forster et al. | 74/763 X |

FOREIGN PATENT DOCUMENTS

| 236182 | 10/1964 | Austria | 74/677 |
| 821734 | 11/1951 | Fed. Rep. of Germany | 74/677 |
| 1923912 | 12/1970 | Fed. Rep. of Germany | 74/718 |
| 464775 | 4/1937 | United Kingdom | 74/677 |
| 632292 | 12/1945 | United Kingdom | 74/763 |

OTHER PUBLICATIONS

"Entirely New Hydra-Matic Drive has Two Fluid Couplings", in Automotive Industries, Nov. 1, 1955.
"Automatic Transmissions", by R. F. Ansdale in Autocar, Nov. 13, 1959.

Primary Examiner—Samuel Scott
Assistant Examiner—P. S. Lall
Attorney, Agent, or Firm—Craig and Antonelli

[57] ABSTRACT

A multi-speed transmission, especially an automatic transmission for vehicles with at least three speeds, utilizing fluid circulations and force-lockingly operable engageable units for the shifting of the transmissions, especially with the use of epicyclic gears, in which the fluid circulations and the engageable units are so coordinated to the epicyclic gears providing the different transmission ratios that the engagement of the speeds under tractional force takes place exclusively by filling and/or emptying of fluid circulations as well as by release of the force-locking engageable units whereas an engagement of the force-locking units takes place only when the latter are not under tractional force whereby at least a part of the fluid circulations serves for the engagement of several speeds and the number thereof is smaller than the number of speeds engaged thereby.

74 Claims, 8 Drawing Figures

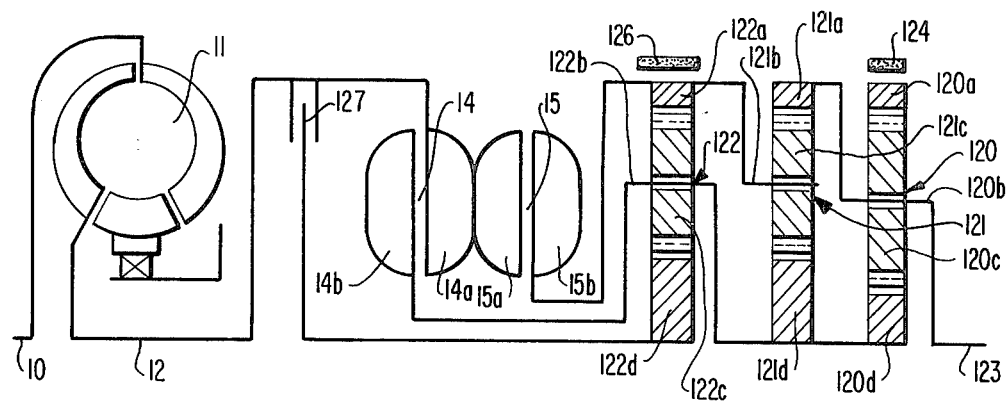
FIG. 6
FIG. 7
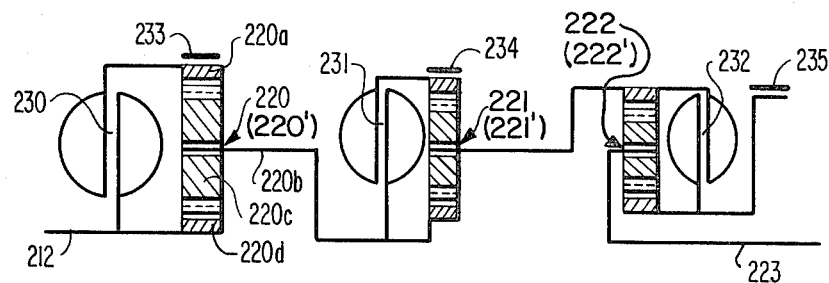
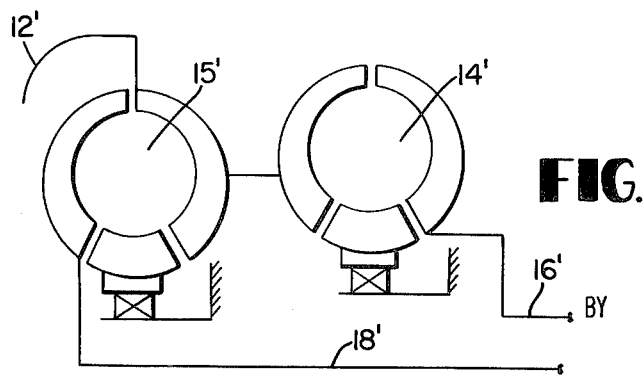
FIG. 1A

MULTI-SPEED TRANSMISSION, ESPECIALLY FOR MOTOR VEHICLES

The present invention relates to a multi-speed transmission, especially to automatic transmissions for motor vehicles, having at least three speeds and using fluid circulations and force-lockingly effective engageable units (frictionally engageable drive establishing means) for the shifting of the transmission speeds, especially by means of planetary gears.

Engageable units operating with friction, to which belong within the meaning of the present invention above all also brakes, entail difficulties especially also in automatic transmission because the reaction time thereof, i.e., the duration of the engagement of a speed by engagement of said engageable friction units, has to be controlled within the relatively narrow limits of a soft shifting transition, on the one hand, and the heat resistance of the material, on the other. The problem of the occurring heat to be carried off in such engageable units operating with friction is the larger the higher the required engine outputs and the more frequent the shifting operations.

Transmission units which operate with fluid circulations adapted to be filled and emptied are known as such in the prior art. Thus, for example, in multi-speed transmissions for railroads, to each individual transmission ratio is coordinated its own fluid circulation which is connected into the system by filling in case of needs. There are as many circulations as there are transmission ratios in these prior art transmissions.

In other multi-speed transmissions, fluid circulations are used for one or the other speed, which, however, cooperate with engageable units operating under friction in such a manner that the shifting up of the individual speeds takes place with the assistance of the engageable units.

All of these prior art transmissions are either very expensive by reason of the large number of fluid circulatory systems or are insufficiently reliable as regards their operating safety, especially with large outputs, by the use of engageable units to be engaged under traction.

The present invention is concerned with the task to realize a transmission, especially an automatic transmission, to be shifted under tractional force and to avoid thereby all of those elements which are subjected to a significant wear, especially also when the transmission is provided for vehicles with high engine outputs, for example, commercial types of vehicles such as trucks or buses—approximately with 300-600 HP or above—, self-propelled rail cars, special vehicles or also locomotives with still higher power outputs.

Accordingly, the present invention resides in such a coordination of the fluid circulations and of the force-locking engageable units to the change-speed transmission ratios forming the speeds, that the engagement of the speeds under traction takes place exclusively by filling and/or emptying of the fluid circulatory systems as well as by release of the frictionally engageable units, whereas an engagement of the frictionally engageable units takes place only when they are not under traction, i.e. when no torque is to be transmitted thereby, whereby at least a part of the fluid circulations serves for the shifting of several speeds and their number is smaller than the number of the speeds to be engaged thereby.

In a particularly preferred embodiment of the present invention, the shifting-up takes place exclusively by filling and/or emptying of fluid circulations as well as by the release or disengagement of the frictionally engageable units.

A high operating safety of the transmission can be combined by the present invention with relatively slight structural expenditures. The transmission, especially also an automatic transmission, can be utilized also with very high engine power outputs without the danger of a premature wear or failure of engageable units operating under friction.

Preferably the lowest forward speed as well as also the reverse speed are thereby mechanically transmitted since a shifting into these speeds takes place only as a down-shifting operation or as a shifting from standstill. Such a mechanical power transmission in the lowest and in the reverse speed is of advantage especially if, for example, a torque converter effective as fluid transmission or a gas turbine is connected in the input of the transmission because a high conversion can be attained thereby within the range of the braking point, i.e., when the vehicle is stopped as a result of a braking action. If, on the other hand, all fluid circulations are each utilized for the shifting of various speeds, then the number of such fluid circulations can be limited to a minimum.

Preferably hydraulic couplings are used as fluid circulations, however, also fluid circulations may be provided which operate with other media, for example, with powder-like materials or otherwise in a similar manner, for example, as electrical eddy current clutches or the like. Of course, the principle according to the present invention can also be applied to vehicles having a lower specific output.

In a particularly preferred embodiment, the engageable units are constructed as brakes acting on epicyclic gears which are engaged in the respective lower speed and are disengaged one after the other when shifting up. In addition to a simple shifting, such a transmission offers the advantage that all support moments are transmitted to the transmission housing by way of the brake. The brakes can be constructed as friction brakes also at high outputs because they are engaged only during shifting down, i.e., as a rule with a relieved drive, i.e., when the load is removed at the time of engagement.

If s fluid circulations are arranged in the transmission, then with the greatest possible utilization thereof, altogether $s \cdot (s-1) \cdot (s-2) \ldots +2$ forward speeds may be engaged with the same (whereby the parenthetical expressions are admissible only as positive numbers). If, for example, $s=2$, then four speeds can be engaged ($2 \cdot 1 + 2$) whereas with $s=3$, eight forward speeds can be engaged ($3 \cdot 2 \cdot 1 + 2$).

An embodiment especially advantageous in construction and in the shifting manner of a four-speed transmission according to the present invention results if three epicyclic gears connected one behind the other and two fluid circulatory systems adapted to be filled and emptied are provided for the four forward speeds, whereby a first planetary gear series-connected in the drive transmission includes a direct drive in by-passing relationship to the fluid units whereas the other two planetary gears each include a drive by way of at least one of the two fluid units. The fluid units are thereby preferably connected in parallel to one another.

Advantageously, the fluid units are arranged thereby in front of the planetary gears and the latter are arranged in front of the frictionally engageable units, especially of brakes, as viewed in the drive direction of the transmission.

If the fluid circulations adapted to filled and emptied are installed adjacent one another, one obtains the further advantage that when changing from one to the other fluid circulation a direct fluid exchange can take place and therewith a more rapid filling or emptying can be achieved.

The present invention further relates to a multi-speed transmission in which planetary gears each connected with a fluid circulation and a brake are connected in series in the drive direction, especially in such a manner that each of the planetary gears is adapted to be bypassed or bridged by the coordinated fluid circulation. Also in this case, a maximum number of speeds can be achieved with a minimum number of fluid circulations adapted to be filled and emptied.

If the fluid circulations are constructed as hydraulic fluid couplings they may include straight blades in the usual manner. However, it is also possible to provide an inclined blading of the hydraulic couplings whereby the same reference a particular strength and rigidity. By reason of the different characteristics of such hydraulic couplings with inclined blades as regards thrust or traction, which represent a type of hydrodynamic free-wheeling device, the control of the tractional force shifting can be facilitated. Possibly, the inclined position of the blades may be pushed almost to a complete free-wheeling so that also an over-gas shifting-back can be carried out without difficulty.

Accordingly, it is an object of the present invention to provide a multi-speed transmission, especially an automatic transmission for motor vehicles which avoids by simple means the aforementioned shortcomings and drawbacks encountered in the prior art.

Another object of the present invention resides in a multi-speed transmission of the type described above which minimizes the number of fluid circulatory systems necessitated while maximizing the number of speeds obtainable thereby.

A further object of the present invention resides in a multi-speed transmission, especially in an automatic transmission for motor vehicles, which excels by simplicity in construction and reliability in operation.

Still another object of the present invention resides in a multi-speed transmission in which all those elements are avoided which are subjected to any significant wear during the operation, especially during the shifting of the transmission.

Another object of the present invention resides in a multi-speed transmission which can be readily used with driving engines or prime movers of any power output.

These and further objects, features, and advantages of the present invention will become more apparent from the following description when taken in connection with the accompanying drawing which shows, for purposes of illustration only, several embodiments in accordance with the present invention, and wherein:

FIG. 1A is a partial schematic view corresponding to a portion of FIG. 1 and illustrating a modification of the present invention with torque converters in place of the fluid couplings of the FIG. 1 embodiment;

FIG. 6 is a schematic view of a modified embodiment of a four-speed transmission in accordance with the present invention; and FIG. 7 is a still further modified embodiment of a multi-speed transmission in accordance with the present invention with units arranged in series one behind the other and consisting each of a planetary gear and a fluid circulation.

Figure 1:
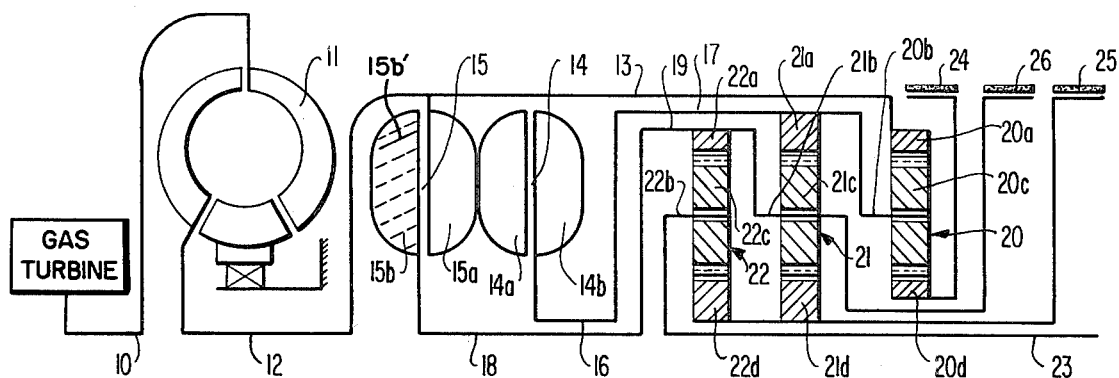
FIG. 1 is a schematic view of a four-speed transmission in accordance with the present invention.

Referring now to the drawing wherein like reference numerals are used throughout the various views to designate like parts, and more particularly to FIG. 1, in this embodiment the transmission input shaft 12 is driven by a drive shaft 10 coming from the engine (schematically illustrated as a gas turbine in FIG. 1) by way of a torque converter 11. The rotating transmission housing 13 is rigidly connected with the transmission input shaft 12; the pump wheels 14a and 15a of the fluid circulations (fluid couplings) 14 and 15 are securely connected, in their turn, with the transmission input shaft 12. The turbine wheel 14b of the fluid coupling 14 is securely connected by way of a hollow shaft 16 with the rotating transmission housing 17 whereas the turbine wheel 15b of the fluid coupling 15 is securely connected by way of a shaft 18 with a rotating transmission housing 19.

In turbine wheel 15b, inclined blading 15b' is schematically shown in dash line to illustrate a modified fluid coupling arrangement with inclined blading. FIG. 1A is a partial view corresponding to portions of FIG. 1 and showing torque converters 15' and 14' substituted respectively for fluid couplings 15 and 14 of FIG. 1, with the transmission lines 12', 18' and 16' corresponding too the similar non-prime lines in FIG. 1.

The nested rotating transmission housings 13, 17 and 19 serve as the drive of the epicyclic gears constructed as planetary gears and generally designated by reference numerals 20, 21 and 22 in that the outer central gears (ring gears) 20a, 21a and 22a are securely connected with the rotating transmission housings 13, 17 and 19 respectively. The rotating transmission housing 17 and thus the outer central gear 21a of the planetary gear 21 is kinematically at the same time the planet carrier 20b of the planetary gear 20 whereas the rotating transmission housing 19 and thus the outer central gear 22a of the planetary gear 22 is simultaneously the planet carrier 21b of the planetary gear 21. The planet carrier 22b of the planetary gear 22 is further kinematically simultaneously the output shaft 23 of the transmission which leads to the driven wheels of the vehicle, for example, by way of one or several axle gears.

The planet gears 20c, 21c and 22c are loosely rotatably mounted in the usual manner on the planet carriers 20b, 21b and 22b, respectively. The planet gears 20c, 21c and 22c are in constant meshing engagement with the inner central gears (sun gears) 20d, 21d and 22d, while the inner central gear 20d is adapted to be braked by a brake 24 and the inner central gears 21d and 22d can be braked in unison by a brake 25 at the stationary housing of the transmission or at any other stationary part thereof. Furthermore, the planet carrier 21b is adapted to be braked at the housing or the like by a further brake 26.

In FIGS. 2 to 5, the force transmission or power flow is schematically illustrated in the four forward speeds corresponding to FIG. 1. In these figures, only the power flow is indicated by way of those elements which participate in the speed transmission whereby the transmission parts which are bridged or by-passed, i.e, which rotate as a unit apart from a slippage in the fluid circulations, are indicated by cross-hatching. The power flow in the individual speeds as well as the engagement thereof takes place in the following manner:

First Speed

Figure 2:
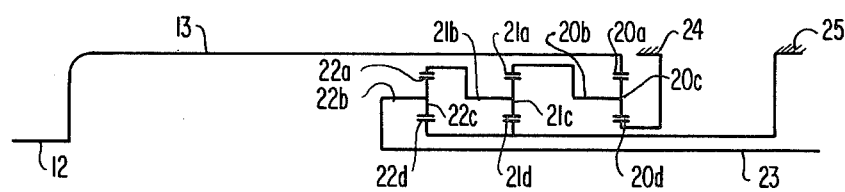
FIGS. 2 to 5 are schematic views illustrating the shifting operation for the transmission according to FIG. 1.
Figure 3:
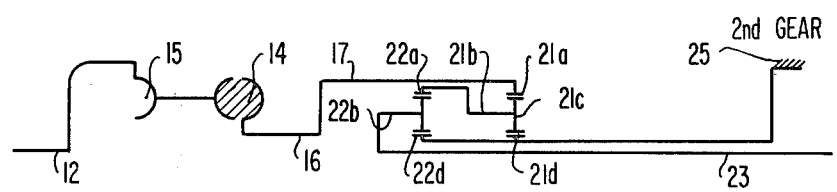
Figure 4:
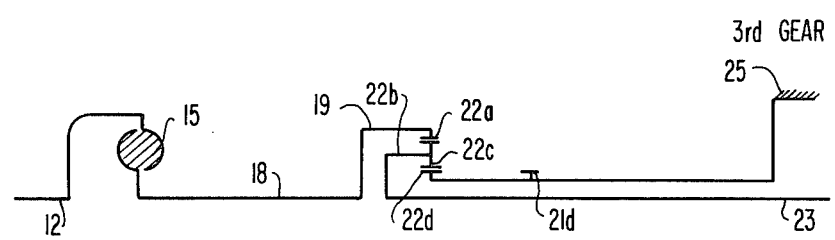

The fluid circulations 14 and 15 are emptied while the brakes 24 and 25 are engaged. The power flow, i.e., transmission of torque takes place with braked inner central gears 20d, 21d and 22d by way of the transmission input shaft 12, the rotating housing 13, the outer central gear 20a, the planet gear 20c, the planet carrier 20b the outer central gear 21a the planet gear 21c, the planet carrier 21b, the outer central gear 22a, the planet gear 22c, and the planet carrier 22b to the output shaft 23 (FIG. 2). As a result thereof, a speed reduction takes place in each of the planetary gears 20, 21 and 22.

Second Speed

For shifting from first into second speed, the brake 24 is disengaged and the fluid circulation 14 is filled. With continued brake inner central gears 21d and 22d, the drive takes place then by way of the transmission input shaft 12, the fluid coupling 14, the hollow shaft 16, the rotating transmission housing 17, the outer central gear 21a, the planet gear 21c, the planet carrier 21b, the outer central gear 22a, the planet gear 22c and the planet carrier 22b to the output shaft 23. The planetary gear 20 thereby idles along (FIG. 3) so that the speed reduction is reduced by the elimination of the speed-reduction in the planetary gear 20.

Third Speed

For shifting from the second into the third speed, the fluid circulation 14 is emptied and the fluid circulation 15 is filled. The drive then takes place by way of the transmission input shaft 12, the fluid coupling 15, the shaft 18, the rotating transmission housing 19, the outer central gear 22a, the planet gear 22c and the planet carrier 22b to the output shaft 23 whereby the inner central gear 22d remains braked by the continued engagement of brake 25 whereas the planetary gears 21 and 20 idle along with inner central gear 21d also remaining braked (FIG. 4) so that the speed reduction is further reduced in the transmission.

Fourth Speed

Figure 5:
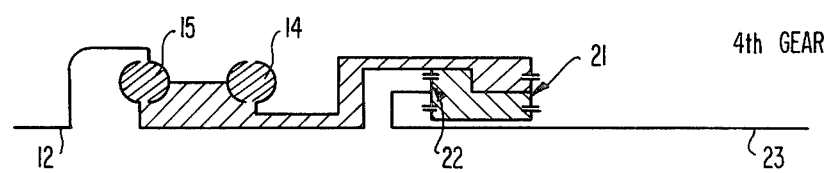

The brake 25 is disengaged and simultaneously in addition to the fluid coupling 15, the fluid coupling 14 is filled. As a result of the simultaneous filling of both fluid couplings 14 and 15, the planetary gears 21 and 22 rotate as a unit and thereby drive the output shaft 23 with a direct transmission ratio whereby the torque to be transmitted is split by way of the two planetary gears 21 and 22. A slippage may thereby result in the couplings 14 and 15. The planetary gear 20 idles along. The direct transmission is thereby indicated by the cross-hatching between the two transmission connections (FIG. 5).

Reverse Speed

The reverse speed can be engaged from first speed by engagement of the brake 26 and disengagement of the brake 25. The transmission of torque then takes place in this case by way of the transmission input shaft 13, the outer central gear 20a, the planet gear 20c, the planet carrier 20b, the outer central gear 21a, the planet gear 21c, the inner central gear 21d, the inner central gear 22d, the planet gear 22c and the planet carrier 22b to the output shaft 23.

In the embodiment according to FIG. 6, the transmission elements 10, 11, 12, 14 and 15 are the same as in the embodiment according to FIG. 1. The three planetary gears are generally disignated by reference numerals 120, 121 and 122 whereas the two brakes are designated by reference numerals 124 and 126 (in each case analogously to corresponding transmission elements of FIG. 1 but utilizing a 100 series of reference numerals). Additionally, a by-pass clutch 127 is provided which by-passes the two fluid circulations 14 and 15 and whose driven clutch half is rigidly connected with the inner central gear 122d of the planetary gear 122.

The transmission of torque and the shifting-up takes place in this embodiment in the following manner:

First Speed

The brake 124 is engaged and the by-pass clutch 127 is engaged. The transmission of torque takes place from the input shaft 12 by way of the by-pass clutch 127, the inner central gear 122d at first to the planetary gear 122 where the drive splits and is transmitted, on the one hand, by way of the planet gear 122c, the planet carrier 122b, the inner central gear 120d and the planet gear 120c to the planet carrier 120b and the output shaft 123, and on the other, by way of the planet gear 122c, the outer central gear 122a, the planet carrier 121b, the planet gear 121c and the outer central gear 121a to the planet carrier 120b and therewith to the output shaft 123.

Second Speed

For shifting from first to the second speed, the by-pass clutch 127 is disengaged, and the fluid coupling 14 is filled. The brake 124 remains engaged. The transmission of torque now takes place by way of the fluid pump half 14a, the turbine half 14b, the planet carrier 122b, the inner central gear 120d, and the planet gear 120c to the planet carrier 120b which is securely connected with the output shaft 123.

Third Speed

The fluid coupling 14 is again emptied, and the fluid coupling 15 is filled. The drive then takes place by way of the fluid pump half 15a, the turbine half 15b, the planet carrier 121b where the drive splits in the planetary gear 121 and is transmitted, on the one hand, by way of planet gear 121c, the inner central 121d, the inner central gear 120d and the planet gear 120c to the planet carrier 120b and, on the other, by way of the planet gear 121c, the outer central gear 121a to the planet carrier 120b and therewith to the output shaft 123.

Fourth Speed

For shifting from third to the fourth speed, in addition to the fluid coupling 15, the fluid coupling 14 is filled again whereas the brake 124 is disengaged. As a result thereof, the three planetary gears 120, 121 and 122 are connected together for a direct dirve of the transmission to the output shaft 123 by way of the turbine wheels 14b and 15b of the two fluid couplings 14 and 15.

Reverse Speed

For the engagement of the reverse speed, the by-pass clutch 127 is engaged with emptied fluid couplings 14 and 15 and the brake 126 is engaged with a disengaged brake 124. The drive then takes place by way of the by-pass clutch 127, the inner central gear 122d, the planet gear 122c, the planet carrier 122b, the inner central gear 121d, the planet gear 121c, to the outer central gear 121a and therewith by way of the planet carrier 120b to the output shaft 123.

As can be readily seen from the foregoing, both in the case of the first as also of the second embodiment, during upward shifting of the speed, the engageable units operating with friction, namely, the brakes 24 and 25 or the by-pass clutch 127 and the brake 124 are merely disengaged sequentially whereas the remaining shifting takes place by filling and emptying of the fluid circulations 14 and 15.

The embodiment according to FIG. 7 illustrates a transmission with three planetary gears generally designated by reference numerals 220, 221 and 222 which cooperate with three fluid couplings 230, 231 and 232 serving as fluid circulations in such a manner that each of the planetary gears can be by-passed or bridged by the associated fluid coupling, i.e., apart from an eventual slippage in the fluid coupling, can be coupled together into a direct drive. Three brakes 233, 234 and 235 cooperate furthermore with a respective one of the planetary gears 220, 221 and 222 in the manner clearly visible from the drawing.

The drive of the transmission takes place by way of a drive shaft 212, whereas the output takes place by way of an output shaft 223. In the illustrated embodiment, furthermore, one of the two central gears is driven whereas the output from a planetary gear takes place always by way of the planet gear carrier thereof in that the planet gear carrier of a preceding planetary gear is connected with a central gear of the next-following planetary gear.

A transmission according to FIG. 7 with three fluid circulations permits according to the formula indicated above altogether $3 \times 2 + 2 = 8$ forward speeds. In particular these speeds are obtained as follows:

First Speed

All three circulations 230, 231 and 232 are emptied and the three brakes 233, 234 and 235 are enaged. The transmission takes place in this case purely mechanically, by braking in each case one of the central gears, by way of the other central gear, the planet gear and the planet carrier of each of the three planetary gears.

Second to Eighth Speed

The remaining speeds are obtained in that each one of the brakes is successively disengaged and in lieu thereof, the associated fluid circulation is filled, or vice versa the fluid circulation is emptied and the associated brake is engaged. Hereinafter, the planetary gears with a mechanical transmission in the respective speeds are designated by 220, 221 and 222 and the planetary gears with a by-passed or bridged transmission, realized by following the respective fluid circulation, are designated by 220', 221' and 222'.

Consequently, the following speed combinations can be achieved:

(1.) 220-221-222
(2.) 220-221-222'
(3.) 220-221'-222
(4.) 220-221'-222'
(5.) 220'-221-222
(6.) 220'-221-222'
(7.) 220'-221'-222
(8.) 220'-221'-222'

With an engaged brake and an emptied fluid circulation, the drive takes place in the respective transmission step consisting of planetary gear and fluid circulation with a high speed reduction to provide a slower rotation in the output thereof. If the brake is disengaged and the associated fluid circulation is filled, a direct drive is achieved in the corresponding transmission step effected by the by-pass, however, with a rotational speed difference between the driving and driven transmission element determined by the slippage in the fluid circulation. By an appropriate selection and graduation of the planetary gears and by suitable sequence in the shifting of the individual speed combinations, a more or less uniformly graduated speed sequence can be achieved if so desired. The fluid circulations can possibly also be constituted by torque converters in lieu of the fluid couplings.

Also the shifting back, in which the fluid circulations are emptied and the brakes (engageable friction units) are engaged, does not take place with brakes at that time under tractional force. Thus, for example in the case of the planetary gear 220 in the direct drive, the outer central gear 220a rotates by way of the fluid circulation in the same direction as the driving inner central gear 220d and as the driven planetary gear carrier 220b. If the fluid circulation 230 is emptied, the outer central gear 220a idles along so that an engagement of the brake 233 can take place without resistance and a resistance builds up only with increasing brake force. Possibly, the brakes could also be replaced by free-wheeling devices of any known construction which permit a rotation of the respective outer central gear in the direction of rotation of the corresponding driving gear element—for the planetary gear 220, the driving gear element 220d —but prevents a rotation in the opposite direction.

While I have shown and described several embodiments in accordance with the present invention, it is understood that the same is not limited thereto but is susceptible of numerous changes and modifications as are known to those skilled in the art, and I therefore do not wish to be limited to the details shown and described herein but intend to cover all such changes and modifications as are encompassed by the scope of the appended claims.

I claim:

1. A multi-speed transmission comprising:
   transmission input shaft means,
   transmission output shaft means,
   gear means including gear members interposed between said input and output shaft means, said gear means being selectively drivingly connectible between said input and output shaft means in a plurality of transmission ratios corresponding to at least three different transmission speeds,
   fluid circulation means including fluid units interposed between said input and output shaft means for selectively coupling said input shaft means to respective gear members of said gear means in response to filling and emptying of respective ones of said fluid units,
   and a plurality of frictionally engageable drive establishing means for selectively frictionally engaging respective ones of said gear members and fluid units in such a manner that the driving connection of said gear members and fluid units with respect to one another is changed in response to changes in the engagement and disengagement conditions of the respective frictionally engageable drive establishing means, wherein the respective gear members of said gear means are under a tractional load when functioning as a torque transmitting member in the driving connection between the input and output shaft means, wherein said frictionally engageable drive establishing means and said fluid circulation means include means for shifting said gear means between transmission ratios by filling and emptying respective fluid units of said circulation means and by selectively engaging and disengaging respective frictionally engageable drive establishing means such that the respective interconnections between said gear members and the input and output shaft means are shifted between the respective transmission ratios, and wherein said fluid circulation means and said frictionally engageable drive establishing means include means for shifting from one transmission ratio to another in such a manner that movement of each of said frictionally engageable drive establishing means from a disengaged to an engaged position takes place only when the respective gear members and fluid units being engaged thereby are not under a tractional load.

2. A multi-speed transmission according to claim 1, characterized in that the gear means include epicyclic gearing means.

3. A multi-speed transmission according to claim 2, characterized in that the frictionally engageable drive establishing means are constructed as a plurality of brakes acting on the epicyclic gear means which brakes are engaged in the lowest transmission speed and are successively disengaged during shifting-up into higher transmission speeds.

4. A multi-speed transmission according to claim 2, characterized in that a plurality of epicyclic gearing means are provided, and in that a fluid unit and a frictionally engageable drive establishing means are provided for each epicyclic gearing means and are connected in series one behind the other in the drive direction.

5. A multi-speed transmission according to claim 4, charcterized in that each epicyclic gearing means is capable of being by-passed by the associated fluid unit.

6. A multi-speed transmission according to claim 5, characterized in that the respective fluid units connect a first with a second gear member of the associated epicyclic gearing means whereas a third gear member of said associated epicyclic gearing means is connected with one of first and second gear members of the next-following epicyclic gearing means and the third gear member of the last epicyclic gearing means is connected with the output shaft means.

7. A multi-speed transmission according to claim 6, characterized in that the respective fluid units are interconnected in each case between an outer central gear constituting the first gear member and an inner central gear constituting the second gear member of an associated epicyclic gear means.

8. A multi-speed transmission according to claim 7, wherein each of said outer central gears is a ring gear and wherein each of said inner central gears is a sun gear.

9. A multi-speed transmission according to claim 1 characterized in that the transmission is capable of operating as an automatic transmission for motor vehicles.

10. A multi-speed transmission according to claim 1, wherein shifting from one transmission speed to a next higher transmission speed is effected exclusively by one of filling and emptying of fluid circulation units of said fluid circulation means and by disengagement of said frictionally engageable drive establishing means.

11. A multi-speed transmission according to claim 10, wherein said transmission speeds includes a reverse speed and a lowest forward speed, characterized by mechanical means for shifting into the lowest speed and the reverse speed.

12. A multi-speed transmission according to claim 1, characterized by such a connection of the fluid units of the fluid circulation means in conjunction with the gear means that with s fluid units altogether $s \cdot (s-1)(s-2) \cdot + 2$ forward transmission speeds are engageable, whereby only those parenthetical factors are to be considered whose values are a positive number.

13. A multi-speed transmission according to claim 1, with at least four forward transmission speeds characterized in that sai gear means includes three series-connected epicyclic gearing means and in that said fluid circulation means includes two fluid units capable of being filled and emptied during shifting between the four forward speeds, a first of said epicyclic gearing means including a direct drive by-passing the fluid circulation means whereas the other epicyclic gearing means each include an input by way of at least one of the two fluid units.

14. A multi-speed transmission according to claim 13, characterized in that the fluid units are connected in parallel with one another.

15. A multi-speed transmission according to claim 14, characterized in that the fluid units are positioned spatially directly adjacent one another.

16. A multi-speed transmission according to claim 13, characterized in that the fluid units are positioned spatially directly adjacent one another.

17. A multi-speed transmission according to claim 13, with four forward transmission speeds characterized in that in the lowest of the four speeds, two frictionally engageable drive establishing means are engaged and the fluid units are emptied, whereas for shifting to the next higher speed, one of the frictionally engageable drive establishing means is disengaged and one of the fluid units is filled, for the shifting to the next higher speed, the previously filled fluid unit is emptied and the other fluid unit is filled, and for the shifting to the highest of the four speeds, the second frictionally engageable drive establishing means is released and in addition to the last-filled fluid unit also the first fluid unit is again filled.

18. A multi-speed transmission according to claim 17, characterized in that the frictionally engageable drive establishing means are brakes.

19. A multi-speed transmission according to claim 17, characterized in that, as viewed in the drive direction of the transmission, the fluid circulation means are positioned in front of the epicyclic gearing means and the epicyclic gearing means are positioned in front of the frictionally engageable drive establishing means.

20. A multi-speed transmission according to claim 14, characterized in that said frictionally engageable drive establishing means are brakes.

21. A multi-speed transmission according to claim 19, characterized in that a first of said epicyclic gearing means includes a first gear member connected with one of the two fluid units, a second gear member connected with a first of said frictionally engageable drive establishing means a third gear member connected with said output shaft means; characterized in that a second of said epicyclic gearing means includes a first gear member connected with the second fluid unit, a second gear member connected with the first frictionally engageable drive establishing means, and a third gear member connected with the first gear member of the first epicyclic gearing means; and characterized in that the third epicyclic gearing means includes a first gear member connected with a drive in by-passing relationship to the two mentioned fluid units, a second gear member connected with the second frictionally engageable drive establishing means and a third gear member connected with the first gear member of the second epicyclic gearing means.

22. A multi-speed transmission according to claim 21, characterized in that for achieving a reverse transmission speed one of the planet gear carriers of one of the epicyclic gear means is connected with a third frictionally engageable drive establishing means.

23. A multi-speed transmission according to claim 21, characterized in that the first epicyclic gearing means is disposed closest to the fluid circulation means.

24. A multi-speed transmission according to claim 21, characterized in that respectively each of the above-mentioned first gear members is an outer central gear, each of the above-mentioned second gear members is an inner central gear and each of the above-mentioned third gear members is a planet gear carrier.

25. A multi-speed transmission according to claim 24, wherein each of said outer central gears is a ring gear and wherein each of said inner central gears is a sun gear.

26. A multi-speed transmission according to claim 24, characterized in that of the fluid units positioned in front of the epicyclic gear means as viewed in the drive direction, the first fluid unit is positioned in front of the second fluid unit, and in that of the frictionally engageable drive establishing means the second frictionally engageable drive establishing means is positioned in front of the first frictionally engageable drive establishing means.

27. A multi-speed transmission according to claim 26, characterized in that said frictionally engageable drive establishing means are brakes.

28. A multi-speed transmission according to claim 27, characterized in that said fluid units are fluid couplings.

29. A multi-speed transmission according to claim 27, characterized in that said fluid units are torque converters.

30. A multi-speed transmission according to claim 26, characterized in that for achieving a reverse speed one of the planet gear carriers of one of the epicyclic gearing means is connected with a third frictionally engageable drive establishing means.

31. A multi-speed transmission according to claim 30, characterized in that the second epicyclic gearing means is connected with the third frictionally engageable drive establishing means constituted by a brake.

32. A multi-speed transmission according to claim 1, characterized in that the frictionally engageable drive establishing means are constructed as brakes acting on the gear members of the gear means, a plurality of said frictionally engageable drive establishing means being engaged in the lowest speed which are successively disengaged during shifting-up to higher transmission speeds.

33. A multi-speed transmission according to claim 32, wherein said transmission speeds includes a reverse speed and a lowest forward speed, characterized by mechanical means for shifting into the lowest speed as well as the reverse speed.

34. A multi-speed transmission according to claim 32, characterized by such a connection of the fluid units of the fluid circulation means in conjunction with the gear means that with s fluid units altogether $s \cdot (s-1)(s-2) \cdot + 2$ forward transmission speeds are engageable, whereby only those parenthetical factors are to be considered whose values are a positive number.

35. A multi-speed transmission according to claim 34, with at least four forward transmission speeds characterized in that said gear means includes three series-connected epicyclic gearing means and in that said fluid circulation means includes two fluid units capable of being filled and emptied during shifting between the four forward speeds, a first of said epicyclic gearing means including a direct drive by-passing the fluid circulation means whereas the other epicyclic gearing means each include an input by way of at least one of the two fluid units.

36. A multi-speed transmission according to claim 1, with four forward transmission speeds characterized in that in the lowest of the four speeds, two frictionally engageable drive establishing means are engaged and the fluid units are emptied, whereas for shifting to the next higher speed, one of the frictionally engageable drive establishing means is disengaged and one of the fluid units is filled, for the shifting to the next higher speed, the previously filled fluid unit is emptied and the other fluid unit is filled, and for the shifting to the highest of the four speeds, the second frictionally engageable drive establishing means is released and in addition to the last-filled fluid unit also the first fluid unit is again filled.

37. A multi-speed transmission according to claim 36, characterized in that, as viewed in the drive direction of the transmission, the fluid circulation means are positioned in front of the epicyclic gearing means and the epicyclic gearing means are positioned in front of the frictionally engageable drive establishing means.

38. A multi-speed transmission with at least three gear means, at least two fluid units and at least two frictionally engageable dive establishing means according to claim 36, characterized in that a first of said gear means includes a first gear member connected with one of the two fluid units, a second gear member connected with a first of said frictionally engageable drive establishing means and a third gear member connected with said output shaft means, a second of said gear means includes a first gear member connected with a second of said fluid unit, a second gear member connected with the first frictionally engageable drive establishing means, and a third gear member connected with the first gear member of the first gear means, and that a third of said gear means includes a first gear member connected with a drive in by-passing relationship to the two mentioned fluid units, a second gear member connected with a second of the frictionally engageable drive establishing means and a third gear member connected with the first gear member of the second gear means.

39. A multi-speed transmission according to claim 38, characterized in that of the fluid units positioned in front of the epicyclic gear means as viewed in the drive direction, the first fluid unit is positioned in front of the second fluid unit, and in that of the frictionally engageable drive establishing means the second frictionally engageable drive establishing means is arranged in front of the first frictionally engageable drive establishing means.

40. A multi-speed transmission according to claim 1 characterized in that the fluid units are constructed as hydraulic fluid couplings.

41. A multi-speed transmission according to claim 40, characterized in that the fluid units include inclined blading means.

42. A multi-speed transmission according to claim 40, characterized in that a torque converter is connected to the input shaft means of the transmission.

43. A multi-speed transmission according to claim 40, characterized in that a gas turbine is connected in the input of the transmission.

44. A multi-speed transmission according to claim 1, characterized in that the fluid units include inclined blading means.

45. A multi-speed transmission according to claim 44, characterized in that said blading means form part of fluid couplings.

46. A multi-speed transmission according to claim 1, characterized in that a plurality of gear means are provided, each of said gear means being associated with a fluid unit and a frictionally engageable drive establishing means connected in series one behind the other in the drive direction.

47. A multi-speed transmission according to claim 46, characterized in that each gear means is capable of being by-passed by the associated fluid unit.

48. A multi-speed transmission according to claim 46, characterized in that the respective fluid units connect a first with a second gear member of the associated gear means whereas a third gear member of the associated gear means is connected with one of the two first and second gear members of the next-following gear means and the third gear member of the last gear means is connected with an output of the transmission.

49. A multi-speed transmission comprising:
transmission input shaft means,
transmission output shaft means,
gear means including gear members interposed between said input and output shaft means, said gear means being selectively drivingly connectible between said input and output shaft means in a plurality of transmission ratios corresponding to at least three different forward transmission speeds,
fluid circulation means including a plurality of fluid units interposed between said input and output shaft means for selectively coupling said input shaft means to respective gear members of said gear means in response to filling and emptying of respective ones of said fluid units,
a plurality of frictionally engageable drive establishing means for selectively frictionally engaging respective ones of said gear members and fluid units in such a manner that the driving connection of said gear members and fluid units with respect to one another is changed in response to changes in the engagement and disengagement conditions of the respective frictionally engageable drive establishing means,
and shifting means for shifting said gear means between all of said transmission ratios exclusively y filling and emptying respective fluid units of said circulation means and by selectively engaging and disengaging respective frictionally engageable drive establishing means such that the respective interconnections between said gear members and the input and output shaft means are shifted between the respective transmission ratios,
wherein the respective gear members of said gear means are under a tractional load when functioning as a torque transmitting member in the driving connection between the input and output shaft means,
and wherein said fluid circulation means and said frictionally engageable drive establishing means are constructed in such a manner that movement of each of said frictionally engageable drive establishing means from a disengaged to an engaged position takes place only when the respective gear members and fluid units being engaged thereby are not under a tractional load for all shifting operations between said transmission ratios.

50. A multi-speed transmission according to claim 49, wherein said transmission speeds includes a reverse speed and a lowest forward speed, characterized by mechanical means for shifting into the lowest speed and the reverse speed.

51. A multi-speed transmission according to claim 49, characterized by such a connection of the fluid units of the fluid circulation means in conjunction with the gear means that with s fluid units altogether $s \cdot (s-1) (s-2) \cdot + 2$ forward transmission speeds are engageable, whereby only those parenthetical factors are to be considered whose values are a positive number.

52. A multi-speed transmission according to claim 49, with at least four forward transmission speeds characterized in that said gear means includes three series-connected epicyclic gearing means and in that said fluid circulation means includes two fluid units capable of being filled and emptied during shifting between the four forward speeds, a first of said epicyclic gearing means including a direct drive bypassing the fluid circulation means whereas the other epicyclic gearing means each include an input by way of at least one of the two fluid units.

53. A multi-speed transmission according to claim 52, with four forward transmission speeds characterized in that in the lowest of the four speeds, two frictionally engageable drive establishing means are engaged and the fluid units are emptied, whereas for shifting to the next higher speed, one of the frictionally engageable drive stablishing means is disengaged and one of the fluid units is filled, for the shifting to the next higher speed, the previously filled fluid unit is emptied and the other fluid unit is filled, and for the shifting to the highest of the four speeds, the second frictionally engageable drive establishing means is released and in addition to the last-filled fluid unit also the first fluid unit is again filled.

54. A multi-speed transmission according to claim 53, characterized in that, as viewed in the drive direction of the transmission, the fluid circulation means are positioned in front of the epicyclic gearing means and the epicyclic gearing means are positioned in front of the frictionally engageable drive establishing means.

55. A multi-speed transmission according to claim 54, characterized in that a first of said epicyclic gearing means includes a first gear member connected with one of the two fluid units, a second gear member connected with a first of said frictionally engageable drive establishing means and a third gear member connected with said output shaft means; characterized in that a second of said epicyclic gearing means includes a first gear member connected with the second fluid unit, a second gear member connected with the first frictionally engageable drive establishing means, and a third gear member connected with the first gear member of the first epicyclic gearing means; and characterized in that the third epicyclic gearing means includes a first gear member connected with a drive in by-passing relationship to the two mentioned fluid units, a second gear member connected with the second frictionally engageable drive establishing means and a third gear member connected with the first gear member of the second epicyclic gearing means.

56. A multi-speed transmission according to claim 55, characterized in that respectively each of the above-mentioned first gear members is a ring gear, each of the above-mentioned second gear members in a sun gear, and each of the above-mentioned third gear members is a planet gear carrier.

57. A multi-speed transmission according to claim 56, characterized in that of the fluid units positioned in front of the epicyclic gear means as viewed in the drive direction, the first fluid unit is positioned in front of the second fluid unit and in that of the frictionally engageable drive establishing means the second frictionally engageable drive establishing means is positioned in front of the first frictionally engageable drive establishing means.

58. A multi-speed transmission according to claim 57, characterized in that for achieving a reverse speed, one of the planet gear carriers of one of the epicyclic gearing means is connected with a third frictionally engageable drive establishing means.

59. A multi-speed transmission according to claim 58, characterized in that the second epicyclic gearing means is connected with the third frictionally engageable drive establishing means constituted by a brake.

60. A multi-speed transmission according to claim 49, characterized in that the gear means includes a plurality of epicyclic gearing means, and in that a fluid unit and a frictionally engageable drive establishing means are provided for each epicyclic gearing means and are connected in series one behind the other in the drive direction.

61. A multi-speed transmission according to claim 60, characterized in that the respective fluid units connect a first with a second gear member of the associated epicyclic gearing means whereas a third gear member of said associated epicyclic gearing means is connected with one of first and second gear members of the next following epicyclic gearing means and the third gear member of the last epicyclic gearing means is connected with the output shaft means.

62. A multi-speed transmission according to claim 61, characterized in that the respective fluid units are interconnected in each case between a ring gear constituting the first gear member and a sun gear constituting the second gear member of an associated epicyclic gearing means.

63. A multi-speed transmission according to claim 49, with four forward transmission speeds characterized in that in the lowest of the four speeds, two frictionally engageable drive establishing means are engaged and the fluid units are emptied, whereas for shifting to the next higher speed, one of the frictionally engageable drive establishing means is disengaged and one of the fluid units is filled, for the shifting to the next higher speed, the previously filled fluid unit is emptied and the other fluid unit is filled, and for the shifting to the highest of the four speeds, the second frictionally engageable drive establishing means is released and in addition to the last-filled fluid unit also the first fluid unit is again filled.

64. A multi-speed transmission according to claim 63, characterized in that a first of said gear means includes a first gear member connected with one of the two fluid units, a second gear member connected with a first of said frictionally engageable drive establishing means and a third gear member connected with said output shaft means, a second of said gear means includes a first gear member connected with a second of said fluid unit, a second gear member connected with the first frictionally engageable drive establishing means, and a third gear member connected with the first gear member of the first gear means, and that a third of said gear means includes a first gear member connected with a drive in by-passing relationship to the two mentioned fluid units, a second gear member connected with a second of the frictionally engageable drive establishing means and a third gear member connected with the first gear member of the second gear means.

65. A multi-speed transmission according to claim 49, characterized in that the frictionally engageable drive establishing means are constructed as brakes acting on the gear members of the gear means, a plurality of said frictionally engageable drive establishing means being engaged in the lowest speed which are successively disengaged during shifting-up to higher transmission speeds.

66. A multi-speed transmission according to claim 65, characterized by such a connection of the fluid units of the fluid circulation means in conjunction with the gear means that with s fluid units altogether $s \cdot (s-1)(s-2) + 2$ forward transmission speeds are engageable, whereby only those parenthetical factors are to be considered whose values are a positive number.

67. A multi-speed transmission comprising:
transmission input shaft means,
transmission output shaft means,
gear means including gear members interposed between said input and output shaft means, said gear means being selectively drivingly connectible between said input and output shaft means in a plurality of transmission ratios corresponding to at least three different forward transmission speeds,
fluid circulation means including a plurality of fluid units interposed between said input and output shaft means for selectively coupling said input shaft means to respective gear members of said gear means in response to filling and emptying of respective ones of said fluid units,
and a plurality of frictionally engageable drive establishing means for selectively frictionally engaging respective ones of said gear members and fluid units in such a manner that the driving connection of said gear members and fluid units with respect to one another is changed in response to changes in the engagement and disengagement conditions of the respective frictionally engageable drive establishing means, and shifting means for shifting said gear means between all of said forward transmission radios exclusively by filling and emptying respective fluid units of said circulation means and by selectively engaging and disengaging respective frictionally engageable drive establishing means such that the respective interconnections between said gear members and the input an output shaft means are shifted between the respective transmission ratios, wherein said fluid circulation means and said frictionally engageable drive establishing means are constructed in such a manner that movement of each of said frictionally engageable drive establishing means from a disengaged to an engaged position takes place only when the transmission is being shifted from a higher to a lower of said forward transmission speeds.

68. A multi-speed transmission according to claim 67, wherein said transmission speeds includes a reverse speed and a lowest forward speed, characterized by mechanical means for shifting into the lowest speed and the reverse speed.

69. A multi-speed transmission according to claim 67, characterized by such a connection of the fluid units of the fluid circulation means in conjunction with the gear means that with s fluid units altogether $s \cdot (s-1)(s-2) + 2$ forward transmission speeds are engageable, whereby only those parenthetical factors are to be considered whose values are a positive number.

70. A multi-speed transmission according to claim 67, with at least four forward transmission speeds characterized in that said gear means includes three series-connected epicyclic gearing means and in that said fluid circulation means includes two fluid units capable of being filled and emptied during shifting between the four forward speeds, a first of said epicyclic gearing means including a direct drive by-passing the fluid circulation means whereas the other epicyclic gearing means each include an input by way of at least one of the two fluid units.

71. A multi-speed transmission according to claim 70, with four forward transmission speeds characterized in that in the lowest of the four speeds, two frictionally engageable drive establishing means are engaged and the fluid units are emptied, whereas for shifting to the next higher speed, one of the frictionally engageable drive establishing means is disengaged and one of the fluid units is filled, for the shifting to the next higher speed, the previously filled fluid unit is emptied and the other fluid unit is filled, and for the shifting to the highest of the four speeds, the second frictionally engageable drive establishing means is released and in addition to the last-filled fluid unit also the first fluid unit is again filled.

72. A multi-speed transmission according to claim 71, characterized in that, as viewed in the drive direction of the transmission, the fluid circulation means are positioned in front of the epicyclic gearing means and the epicyclic gearing means are positioned in front of the frictionally engageable drive establishing means.

73. A multi-speed transmission according to claim 72, characterized in that a first of said epicyclic gearing means includes a first gear member connected with one of the two fluid units, a second gear member connected with a first of said frictionally engageable drive establishing means and a third gear member connected with said output shaft means; characterized in that a second of said epicyclic gearing means includes a first gear member connected with the second fluid unit, a second gear member connected with the first frictionally engageable drive establishing means, and a third gear member connected with the first gear member of the first epicyclic gearing means; and characterized in that the third epicyclic gearing means includes a first gear member connected with a drive in by-passing relationship to the two mentioned fluid units, a second gear member connected with the second frictionally engageable drive establishing means and a third gear member connected with the first gear member of the second epicyclic gearing means.

74. A multi-speed transmission according to claim 73, characterized in that for achieving a reverse speed, one of the planet gear carriers of one of the epicyclic gearing means is connected with a third frictionally engageable drive establishing means.

* * * * *